United States Patent
Chang (10) Patent No.: US 11,257,361 B2
(45) Date of Patent: Feb. 22, 2022

(54) VEHICLE DRIVING SHOCKWAVE PREDICTION SYSTEM FOR ACTIVE SAFE DRIVING AND METHOD THEREOF

(71) Applicant: National Yunlin University of Science and Technolo, Douliu (TW)

(72) Inventor: Ben-Jye Chang, Douliu (TW)

(73) Assignee: National Yunlin University of Science and Technology, Douliu (TW)

(*) Notice: Subject to any disclaimer, the term of this patent is extended or adjusted under 35 U.S.C. 154(b) by 265 days.

(21) Appl. No.: 16/542,290

(22) Filed: Aug. 15, 2019

(65) Prior Publication Data

US 2021/0049900 A1    Feb. 18, 2021

(51) Int. Cl.
```
G08G 1/01       (2006.01)
G08G 1/052      (2006.01)
H04W 4/029      (2018.01)
H04W 4/44       (2018.01)
H04L 67/10      (2022.01)
```
(52) U.S. Cl.
CPC ........... *G08G 1/0112* (2013.01); *G08G 1/052* (2013.01); *H04W 4/029* (2018.02); *H04W 4/44* (2018.02); *H04L 67/10* (2013.01)

(58) Field of Classification Search
CPC .... G08G 1/0112; G08G 1/052; G08G 1/0133; H04W 4/029; H04W 4/44; H04L 67/10
See application file for complete search history.

(56) References Cited

U.S. PATENT DOCUMENTS

2016/0203712 A1*  7/2016  Blandin .............. G08G 1/0133
                                                    701/117
2020/0168084 A1*  5/2020  Yang ................... G08G 1/0145

* cited by examiner

*Primary Examiner* — Hongmin Fan
(74) *Attorney, Agent, or Firm* — Chih Feng Yeh; Huntington IP Consulting Co., Ltd.

(57) ABSTRACT

A vehicle driving shockwave prediction system for active safe driving and a method thereof are provided. Threat messages promulgated from vehicles in high-threat areas are analyzed through a three-tier cloud computing mechanism to reduce driving threats and shockwaves in traffic flow. The predictive backward shockwave analysis approach (PSA) microscopic car-following analysis is performed to achieve active safe driving in autonomous self-driving vehicles and the human-driving vehicles. Therefore, the technical efficacy of using the multi-tier cloud computing to perform the shockwave prediction analysis for active safe driving may be achieved.

10 Claims, 10 Drawing Sheets

```
┌─────────────────────────────────────────────────────────┐
│ each of a plurality of moving vehicles provides vehicle │  ┌─ 101
│ state information by wireless transmission, wherein the │
│ vehicle state information includes a system time, a road│
│ name, a lane code, a vehicle speed, and a direction of travel │
└─────────────────────────────────────────────────────────┘
                            │
                            ▼
┌─────────────────────────────────────────────────────────┐
│ when receiving an analysis operation instruction, an on-│
│ board server receives the vehicle state information from at│
│ least one of the plurality of moving vehicles that issues a│
│ computing request in an analysis operation instruction and│
│ its neighboring moving vehicles by wireless transmission│  ┌─ 102
│ to perform the MmTFA and the RTSP, wherein the          │
│ MmTFA includes analysis of flow and density, analysis of│
│ position and time, and analysis of front-edge and rear-edge│
│ of a shockwave, and the RTSP includes polynomial        │
│ regression predictions and predictions of the front-edge│
│ and rear-edge of the shockwave                          │
└─────────────────────────────────────────────────────────┘
                            │
                            ▼
┌─────────────────────────────────────────────────────────┐
│ when receiving the analysis operation instruction, a mobile│
│ edge computing server receives the vehicle state         │
│ information from the at least one of the plurality of moving│ ┌─ 103
│ vehicles that issues the computing request in the analysis│
│ operation instruction and all the moving vehicles in a   │
│ preset range of the at least one of the plurality of moving│
│ vehicles that issues the computing request by wireless   │
│ transmission to perform the MmTFA and the RTSP           │
└─────────────────────────────────────────────────────────┘
```

VEHICLE DRIVING SHOCKWAVE PREDICTION SYSTEM FOR ACTIVE SAFE DRIVING AND METHOD THEREOF

BACKGROUND

1. Technical Field

The present invention relates to a prediction system and a method thereof. In particular, the invention pertains to a vehicle driving shockwave prediction system using the multi-tier cloud computing for active safe driving and a method thereof.

2. Description of Related Arts

In most studies of the Intelligent Transportation System (ITS), several mechanisms have been proposed to prevent driving accidents and traffic jam, such as traffic flow analysis, traffic signal control, various-type sensors, and road side unit (RSU), vehicular driving information, vehicular ad-hoc networking (VANET), and V2X communications, to minimize and avoid dangerous and unstable driving of human or autonomous self-driving. Most ITS studies seldom consider the cloud computing-based mechanism that might effectively achieve online and real-time active safe driving.

In summary, it can be seen that there is a problem in the prior art that minimizing and avoiding dangerous and unstable driving of human or autonomous self-driving without the cloud computing. Therefore, it is necessary to propose an improved technical solution to solve this problem.

SUMMARY

In view of the prior art, there is a problem that minimizing and avoiding dangerous and unstable driving of human or autonomous self-driving without the cloud computing, and the present invention discloses a vehicle driving shockwave prediction system for active safe driving and a method thereof.

The vehicle driving shockwave prediction system for active safe driving disclosed in the present invention includes a plurality of moving vehicles, an on-board server, a mobile edge computing server, a cloud computing server, and a processing server.

Each of the plurality of moving vehicles is configured to provide vehicle state information by wireless transmission, wherein the vehicle state information includes a system time, a road name, a lane code, a vehicle speed, and a direction of travel.

The on-board server is configured to receive the vehicle state information from at least one of the plurality of moving vehicles that issues a computing request in an analysis operation instruction and its neighboring moving vehicles by wireless transmission to perform the Macroscopic and Microscopic Traffic Flow Analyses (MmTFA) and the Real-Time Macroscopic and Microscopic Shockwave Predictions (RTSP) when receiving the analysis operation instruction, wherein the MmTFA includes analysis of flow and density, analysis of position and time, and analysis of front-edge and rear-edge of a shockwave, and the RTSP includes polynomial regression predictions and predictions of the front-edge and rear-edge of the shockwave.

The mobile edge computing server is configured to receive the vehicle state information from the at least one of the plurality of moving vehicles that issues the computing request in the analysis operation instruction and all the moving vehicles in a preset range of the at least one of the plurality of moving vehicles that issues the computing request by wireless transmission to perform the MmTFA and the RTSP when receiving the analysis operation instruction.

The cloud computing server is configured to receive the vehicle state information from each moving vehicle by wireless transmission to perform the MmTFA and the RTSP when receiving the analysis operation instruction.

The processing server is configured to receive the computing request from the at least one of the plurality of moving vehicles by wireless transmission to specify and transmit the analysis operation instruction to the server selected from the group consisting of the on-board server, the mobile edge computing server, and the cloud computing server based on different number of the at least one of the plurality of moving vehicles that issues the computing request according to a Map stage in a Map-Reduce mechanism, and merge the analysis results of a predictive backward shockwave from the on-board server, the mobile edge computing server, and the cloud computing server according to a Reduce stage in the Map-Reduce mechanism.

The vehicle driving shockwave prediction method for active safe driving disclosed in the present invention includes the following steps.

First, each of a plurality of moving vehicles provides vehicle state information by wireless transmission, wherein the vehicle state information includes a system time, a road name, a lane code, a vehicle speed, and a direction of travel. Next, when receiving an analysis operation instruction, an on-board server receives the vehicle state information from at least one of the plurality of moving vehicles that issues a computing request in an analysis operation instruction and its neighboring moving vehicles by wireless transmission to perform the MmTFA and the RTSP, wherein the MmTFA includes analysis of flow and density, analysis of position and time, and analysis of front-edge and rear-edge of a shockwave, and the RTSP includes polynomial regression predictions and predictions of the front-edge and rear-edge of the shockwave. Then, when receiving the analysis operation instruction, a mobile edge computing server receives the vehicle state information from the at least one of the plurality of moving vehicles that issues the computing request in the analysis operation instruction and all the moving vehicles in a preset range of the at least one of the plurality of moving vehicles that issues the computing request by wireless transmission to perform the MmTFA and the RTSP. Then, when receiving the analysis operation instruction, a cloud computing server receives the vehicle state information from each moving vehicle by wireless transmission to perform the MmTFA and the RTSP. Finally, a processing server receives the computing request from the at least one of the plurality of moving vehicles by wireless transmission to specify and transmit the analysis operation instruction to the server selected from the group consisting of the on-board server, the mobile edge computing server, and the cloud computing server based on different number of the at least one of the plurality of moving vehicles that issues the computing request according to a Map stage in a Map-Reduce mechanism, and merges the analysis results of a predictive backward shockwave from the on-board server, the mobile edge computing server, and the cloud computing server according to a Reduce stage in the Map-Reduce mechanism.

The system and method disclosed by the present invention are as above, and the differences from the prior art are that the predictions are performed based on big data from the collection of the vehicle state information; the high threats of the backward shockwave are analyzed; the threat messages promulgated from vehicles in high-threat areas through a three-tier cloud computing mechanism are analyzed to reduce driving threats and shockwaves in traffic flow; and the predictive backward shockwave analysis approach (PSA) microscopic car-following analysis is performed to achieve active safe driving in autonomous self-driving vehicles and the human-driving vehicles. Thus, the predicted relative error rate, the accuracy of the backward shockwave measurement, the average vehicle (AVV), the average travel time (ATT), the number of goodput vehicles (NoVs), the time-to-collision (TTC), and the distance-to-collision (DTC) of the present invention are superior to those of the prior art.

By the aforementioned technology means, the present invention can achieve the technical effect of using the multi-tier cloud computing to perform the shockwave prediction analysis for active safe driving.

BRIEF DESCRIPTION OF THE DRAWINGS

The structure, operating principle and effects of the present invention will be described in detail by way of various embodiments which are illustrated in the accompanying drawings.

DETAILED DESCRIPTION

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

As used herein, the term "or" includes any and all combinations of one or more of the associated listed items. It will be understood that when an element is referred to as being "connected to" or "coupled to" another element, it can be directly connected or coupled to the other element, or intervening elements may be present. In contrast, when an element is referred to as being "directly connected to" or "directly coupled to" another element, there are no intervening elements present.

In addition, unless explicitly described to the contrary, the word "comprise" and variations such as "comprises" or "comprising", will be understood to imply the inclusion of stated elements but not the exclusion of any other elements.

Figure 1:
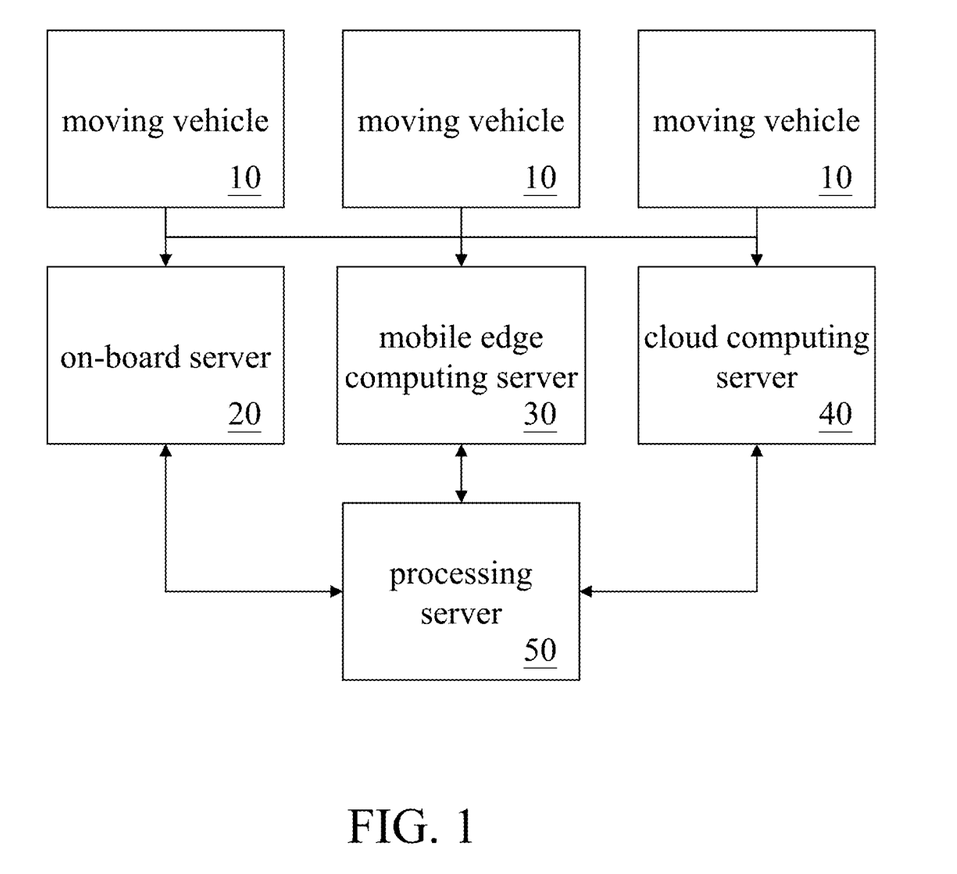
FIG. 1 is a block diagram of a vehicle driving shockwave prediction system for active safe driving according to the present invention.

The following is a description of a vehicle driving shockwave prediction system for active safe driving disclosed in the present invention. Please refer to the FIG. 1, and the FIG. 1 is a block diagram of a vehicle driving shockwave prediction system for active safe driving according to the present invention.

The vehicle driving shockwave prediction system for active safe driving disclosed by the present invention comprises: a plurality of moving vehicles 10, an on-board server 20, a mobile edge computing server 30, a cloud computing server 40, and a processing server 50.

Each of the plurality of moving vehicles 10 provides vehicle state information by wireless transmission, and the vehicle state information includes a system time, a road name, a lane code, a vehicle speed, and a direction of travel.

The on-board server 20 receives the vehicle state information from at least one of the plurality of moving vehicles 10 that issues a computing request in an analysis operation instruction and its neighboring moving vehicles 10 by wireless transmission when receiving the analysis operation instruction from the processing server 50. The neighboring moving vehicles 10 are 2 to 4 moving vehicles 10 adjacent to the moving vehicle 10 that issues the computing request, or the neighboring moving vehicles 10 are 3 to 5 moving vehicles 10 adjacent to the moving vehicle 10 that issues the computing request. This is for illustrative purposes only and is not intended to limit the scope of application of the present invention. Then, the on-board server 20 performs the Macroscopic and Microscopic Traffic Flow Analyses (MmTFA) and the Real-Time Macroscopic and Microscopic Shockwave Predictions (RTSP). The MmTFA includes analysis of flow and density, analysis of position and time, and analysis of front-edge and rear-edge of a shockwave, and the RTSP includes polynomial regression predictions and predictions of the front-edge and rear-edge of the shockwave.

The mobile edge computing server 30 receives the vehicle state information from the at least one of the plurality of moving vehicles 10 that issues the computing request in the analysis operation instruction and all the moving vehicles 10 in a preset range of the at least one of the plurality of moving vehicles 10 that issues the computing request by wireless transmission when receiving the analysis operation instruction from the processing server 50. The preset range is, for example, a range of 1 kilometer of the moving vehicle 10 that issues the computing request, or a range of 500 meters of the mobile vehicle 10 that issues the computing request.

This is for illustrative purposes only and is not intended to limit the scope of application of the present invention. Then, The mobile edge computing server 30 performs the MmTFA and the RTSP.

The cloud computing server 40 receives the vehicle state information from each moving vehicle 10 by wireless transmission when receiving the analysis operation instruction from the processing server 50, and performs the MmTFA and the RTSP. The wireless transmission method described above is, for example, Wi-Fi, the mobile communication network, such as 3G, 4G, and 5G, which is for illustrative purposes only and is not intended to limit the scope of application of the present invention.

The processing server 50 receives the computing request from the at least one of the plurality of moving vehicles 10 by wireless transmission to specify and transmit the analysis operation instruction to the server selected from the group consisting of the on-board server 20, the mobile edge computing server 30, and the cloud computing server 40 based on different number of the at least one of the plurality of moving vehicles that issues the computing request according to the Map stage in the Map-Reduce mechanism. Then, the processing server 50 merges the analysis results of a predictive backward shockwave from the on-board server 20, the mobile edge computing server 30, and the cloud computing server 40 according to the Reduce stage in the Map-Reduce mechanism to further achieve the functionality of the threat driving avoidance.

Figure 2:
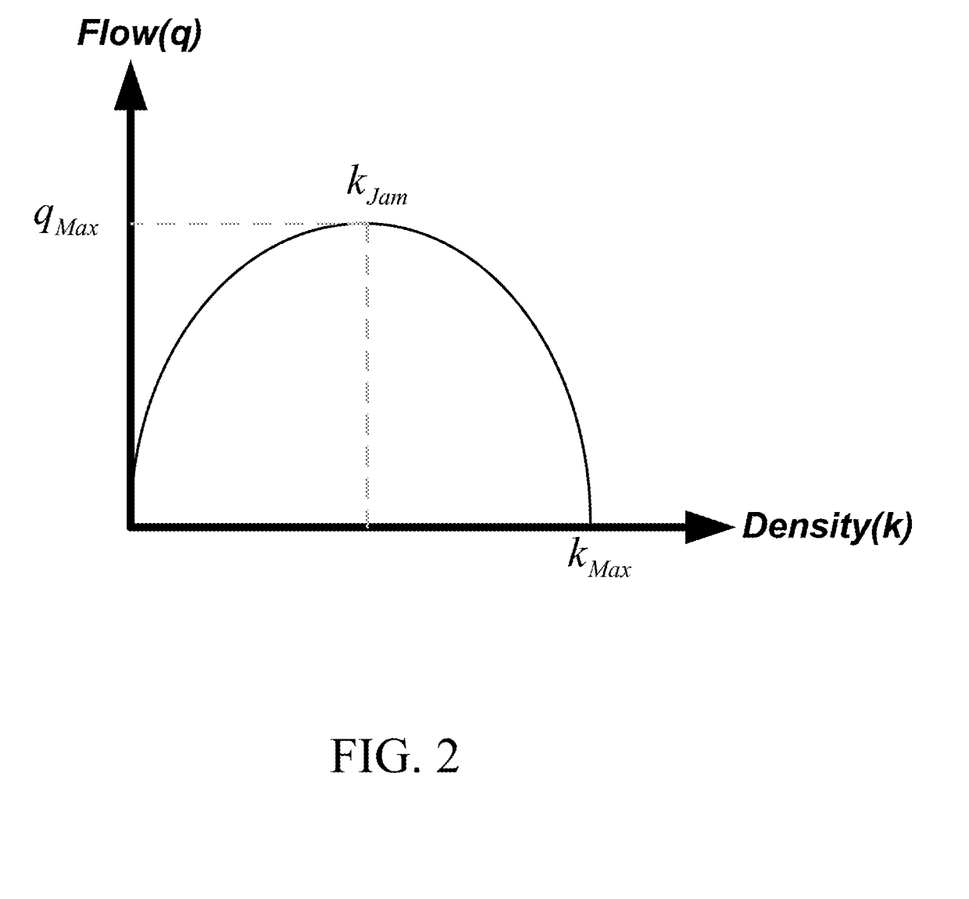
FIG. 2 is a traffic flow-density diagram of the vehicle driving shockwave prediction system for active safe driving according to the present invention.
Figure 3:
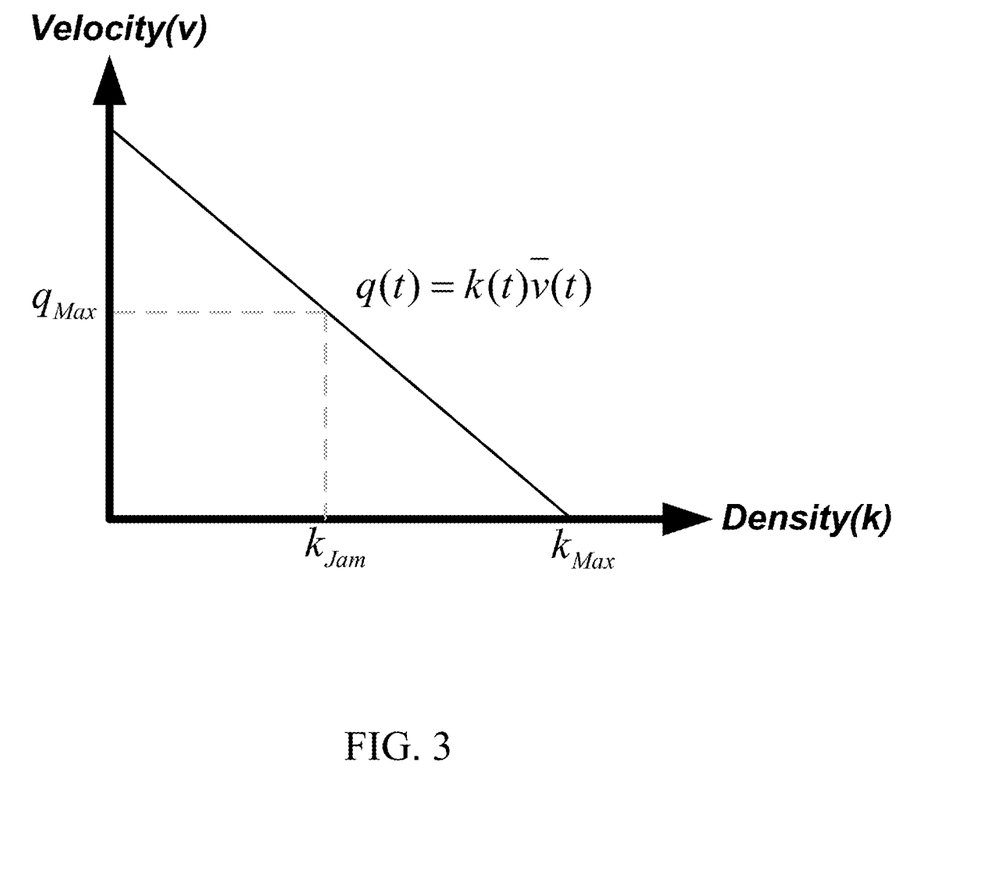
FIG. 3 is a vehicle speed-density diagram of a vehicle driving shockwave predictive analysis for active safe driving according to the present invention.
Figure 4:
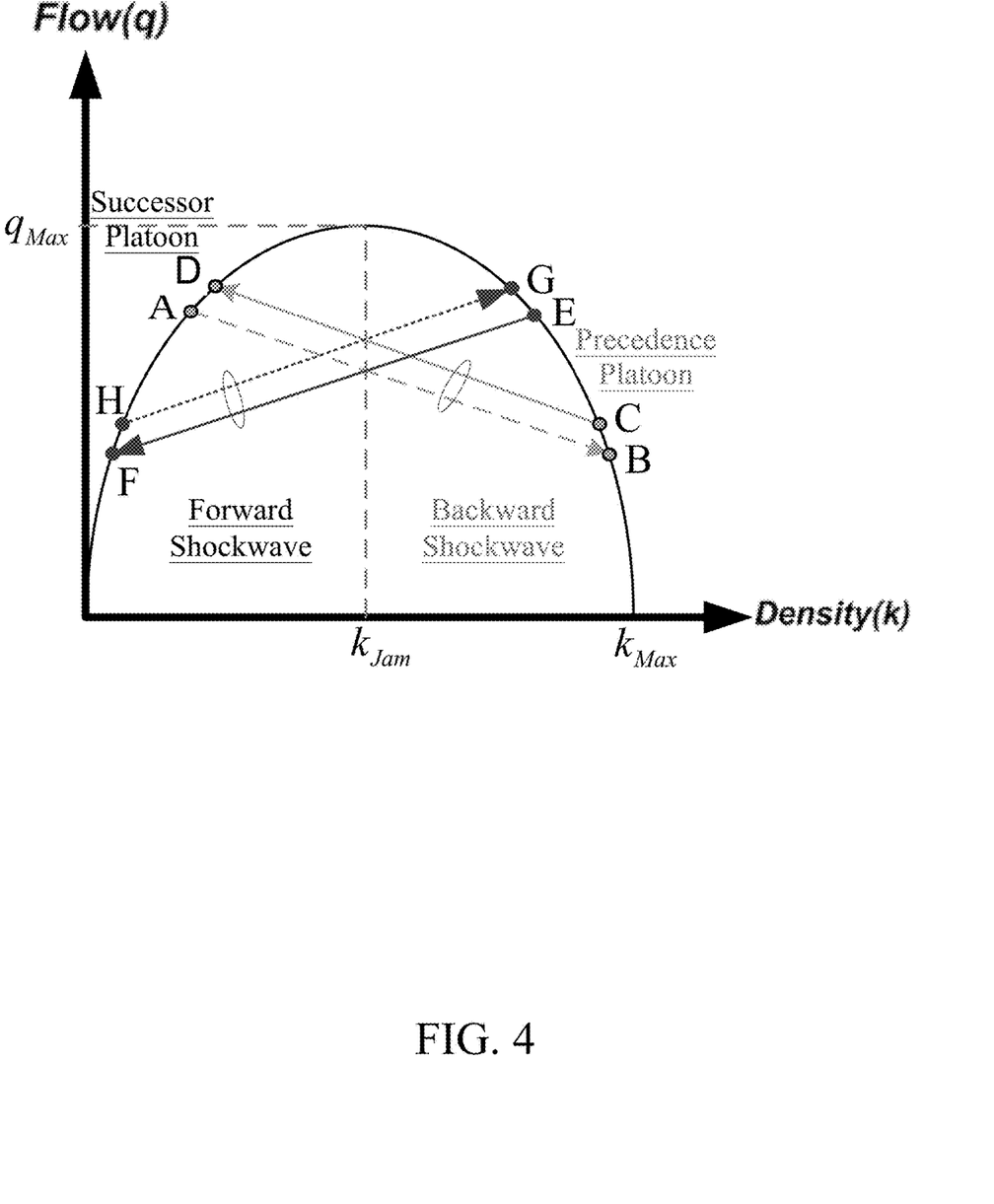
FIG. 4 is a traffic flow-density diagram of the vehicle driving shockwave predictive analysis for active safe driving according to the present invention.

Please refer to FIG. 2, FIG. 3 and FIG. 4. FIG. 2 is a traffic flow-density diagram of the vehicle driving shockwave prediction system for active safe driving according to the present invention, FIG. 3 is a vehicle speed-density diagram of a vehicle driving shockwave predictive analysis for active safe driving according to the present invention, and FIG. 4 is a traffic flow-density diagram of the vehicle driving shockwave predictive analysis for active safe driving according to the present invention.

The analysis of flow and density is extended from the shockwave theory. The unstable driving certainly leads to the forward and backward shockwaves in vehicle traffic flow. The forward shockwave is the shockwave forwardly traverses to the precedence vehicle or platoon, so the forward shockwave can be viewed as the releasing shockwave to define the forward shockwave as the rear-edge of the shockwave. The backward shockwave is the shockwave backwardly traverses to the successor vehicle or platoon, so the backward shockwave acts as the front-edge of the shockwave.

The traffic density k(t) is the factor at time t, and the average speed at time t, expressed as $\bar{v}(t)$, and the analysis of the traffic flow q(t) can be expressed as follows: q(t)=k(t)×$\bar{v}$(t).

In the above formula, the traffic density k(t) is defined as $$k(t) = \frac{N(t)}{L(t)},$$

where N(t) is the number of the moving vehicles on a road segment or within a platoon at time t, and L(t) is a length of the road segment or the platoon at time t. According to the relationship between the speed and the density in the Greenshielded model, the speed can be expressed as follows:

$$v(t) = v_f(t) - \left(\frac{v_f(t)}{k_J(t)}\right)k(t).$$

Where $v_f(t)$ denotes the free flow speed, $k_j(t)$ denotes the density of a jam flow, and setting $k_j(t)$ to half of the maximum $k_{max}(t)$, i.e., $$\frac{k_{max}(t)}{2}$$

(as shown in FIG. 2) to obtain $$q(t) = k(t)v(t) = k(t)\left[v_{FFS}(t) - \left(\frac{v_{FFS}}{k_{Jam}}\right)k(t)\right] = v_f(t)k_t(t) - \left(\frac{v_{FFS}(t)}{k_{Jam}(t)}\right)k^2(t).$$

The maximum traffic flow $q_{max}(t)$ occurs at $$\frac{dq(t)}{dk(t)} = 0,$$

and it can be obtained that $$\frac{dq(t)}{dk(t)} = 0 = v_f(t) - \left(\frac{v_{FFS}(t)}{k_{Jam}(t)}\right)2k(t) \text{ or } k(t) = \frac{k_{Jam}(t)}{2}.$$

Replace the above formula to obtain $$q_{max}(t) = \frac{v_{FFS}(t)k_{Jam}(t)}{4}.$$

The speed of the maximum traffic flow (i.e., $v_{qMax}(t)$) can be obtained by substituting aforementioned formula, $$v_{qMax}(t) = v_{FFS}(t) - \left(\frac{v_{FFS}(t)}{k_{Jam}(t)}\right)\frac{k_{Jam}(t)}{2} = \frac{v_{FFS}(t)}{2}.$$

Extended from the traffic flow theory and the Greenshields model, some keys for the traffic flow analysis are as follows.

The maximum traffic flow $q_{max}(t)$ occurs when $$k(t) = \frac{k_{Jam}(t)}{2} \text{ and } v_{qMax}(t) = \frac{v_{FFS}(t)}{2},$$

and the backward shockwave occurs in two cases: the backward shockwave is traversed from the uncongested precedence platoon to the congested successor platoon, and the backward shockwave is traversed from the congested precedence platoon to the uncongested successor platoon. The shockwave types of the precedence platoon B, the precedence platoon C, the precedence platoon E and the precedence platoon G, and the successor platoon A, the successor platoon D, the successor platoon F and the successor platoon H are shown in FIG. 4 and the following form:

| Type | Direction | State | Shockwave Type |
|------|-----------|-------|----------------|
| I | A→B | $k_s > k_p$ $q_s < q_p$ | Backward |
| II | C→D | $k_s < k_p$ $q_s > q_p$ | Backward |
| III | E→F | $k_s < k_p$ $q_s < q_p$ | Forward |
| IV | G→H | $k_s > k_p$ $q_s > q_p$ | Forward |

The aforementioned backward shockwave from the uncongested precedence platoon to the congested successor platoon needs to meet the following conditions: the density of the precedence platoon i is smaller than that of the successor platoon i+1, i.e., $k_{p_i} > k_{p_i}$ or $k_{p+1} > k_{p_i}$, and the flow rate of the precedence platoon i is greater than that of the successor platoon i+1, i.e., $q_{p_i} > q_{p_i}$ or $q_{p+1} > q_{p_i}$.

The aforementioned backward shockwave from the congested precedence platoon to the uncongested successor platoon needs to meet the following conditions: the density of the precedence platoon i is greater than that of the successor platoon i+1, i.e., $k_{p_i} < k_{p_i}$ or $k_{p+1} < k_{p_i}$, and the flow rate of the precedence platoon i is smaller than that of the successor platoon i+1, i.e., $q_{p_i} > q_{p_i}$ or $q_{p+1} > q_{p_i}$.

The speed of the backward shockwave at time t is determined that $$W^{SW}_{P_i,P_{i+1}}(t) = \frac{q^{Ma}_{P_1}(t) - q^{Ma}_{P_{i+1}}(t)}{k^{Ma}_{P_1}(t) - k^{Ma}_{P_{i+1}}(t)}.$$

Figure 5:
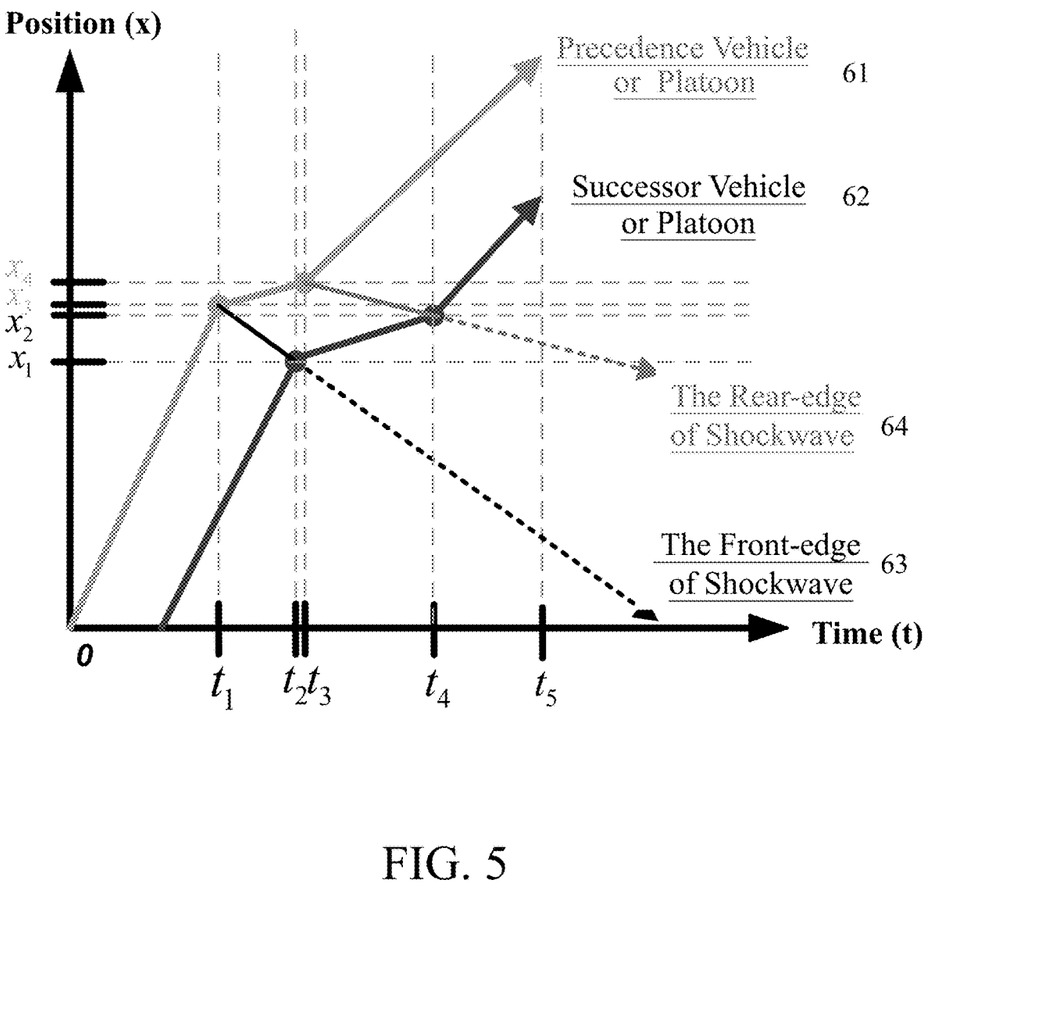
FIG. 5 is a position-time diagram of the vehicle driving shockwave predictive analysis for active safe driving according to the present invention.

Please refer to FIG. 5 and FIG. 5 is a position-time diagram of the vehicle driving shockwave predictive analysis for active safe driving according to the present invention.

The aforementioned analysis of position and time is that after analyzing the backward shockwave speed by using the flow-density curve of the traffic flow, the position-time curve mechanism is extended to analyze shockwaves gathered from data information of the moving vehicles adjacent to each moving vehicle. The precedence vehicle or platoon 61, the successor vehicle or platoon 62, the front-edge of shockwave 63, and the rear-edge of shockwave 64 are shown in FIG. 5, respectively.

The analysis of position-time curve is based on the physical moving theory. Assuming that two moving vehicles are taken as an example to show that a sudden brake decreases the velocity of the precedence vehicle at time $t_1$, a shockwave is traversed backward to the successor vehicle, and then the velocity of the successor one decreases at time $t_2$. It is clear that the backward shockwave is identified at time $t_2$. At time $t_3$, the precedence vehicle speeds up. Then, at time $t_4$, the successor vehicle speeds up and the shockwave is thus released. The gray curve of the backward shockwave is defined as the front-edge that initiates the shockwave, and the block curve is defined as the rear-edge of the shockwave that releases the shockwave. The moving vehicles located between the front-edge and the rear-edge are threatened vehicles to be notified.

The higher the slope, the higher the backward shockwave speed and the higher the driving threat to successor vehicles. How to correctly determine the shockwave in time is important to avoid driving threat. The driving information of each moving vehicle is the data of each moving vehicle, so the determination of the backward shockwave between the vehicles (or platoons) is viewed as the result of each moving vehicle.

Based on the analysis of position and time and the analysis of flow and density, the features of the threat backward shockwave are analyzed. The focus of the backward shockwave is that the shockwave velocity can be applied to the traffic flow (i.e., the flow view) and each moving vehicle (i.e., the vehicle view) to complete the analysis of each moving vehicle at the front-edge and the rear-edge of the shockwave.

The previous driving threat is predicted by the RTSP, so the successor vehicles can effectively avoid the threatening shockwave traversing from the precedence vehicle by changing to alternative road or lane. The aforementioned RTSP proposes a polynomial regression predictive Shock-Wave (SW) method.

In a pre-processing operation, some of the previous positions of the vehicle (or shockwaves under consideration) are important to determine the next predicted position. In order to intensify the polynomial regression-based curve fitting, the preprocess of accumulated generating operation based on the grey system theory is used to achieve the accuracy of the prediction. The preprocessing operation generates a new data sequence by summation of the previous data, which is represented by: $S'(n) = \sum_{p=1}^{n} S(p)$.

Where $S(p)$ means the original data sequence, and $S'(n)$ means the new data sequence after executing the preprocess operation. The purpose of the pre-processing step is to smooth the fitting curve.

After the pre-processing step, the new data sequence is used as the input data for the curve fitting in the position prediction step, and the predicted position in the new sequence is represented as $x'_{predition}$, which is computed by $x'_{predition} = F_{pre}(t+1)$.

Where $F_{pre}(t)$ is a polynomial function with Z+1 unknown coefficients (i.e., $a_i$, $0 \le i \le Z$); that is, $F_{pre}(t) = a_0 t^0 + a_1 t^1 + a_2 t^2 + \ldots + a_Z t^Z$.

The pre-processed prediction position of the previous process is $F_{pre}(t_h) = a_0 t_h^0 + a_1 t_h^1 + a_2 t_h^2 + \ldots + a_Z t_h^Z$.

Let $R_h$ be a position of the previous hth process, and then the sum of the square of difference between actual R and predictive $F_{pre}(t)$ of previous n processes is $D = \sum_{h=1}^{H} [R_h - (a_0 t_h^0 + a_1 t_h^1 + a_2 t_h^2 + \ldots + a_Z t_h^Z)]^2$.

In order to determine each coefficient $a_i$, each $a_i$ in each polynomial acts as a variable and take partial differential of each $a_i$, and then each partial differential equation is set to zero, to obtain the following equivalent polynomial:

$$\begin{cases} a_0\left(\sum_{h=1}^{H} t_h^0\right) + a_1\left(\sum_{h=1}^{H} t_h^1\right) + \ldots + a_Z\left(\sum_{h=1}^{H} t_h^Z\right) = \sum_{h=1}^{H} t_h^0 R_h \\ a_0\left(\sum_{h=1}^{H} t_h^1\right) + a_1\left(\sum_{h=1}^{H} t_h^2\right) + \ldots + a_Z\left(\sum_{h=1}^{H} t_h^{Z+1}\right) = \sum_{h=1}^{H} t_h^1 R_h \\ \vdots \\ a_0\left(\sum_{h=1}^{H} t_h^Z\right) + a_1\left(\sum_{h=1}^{H} t_h^{Z+1}\right) + \ldots + a_Z\left(\sum_{h=1}^{H} t_h^{2Z}\right) = \sum_{h=1}^{H} t_h^Z R_h \end{cases}$$

After determining all the summations of the above polynomials, the matrix of polynomials can be simplified to an upper triangle matrix of polynomials. Each coefficient $a_i$ can be determined by the Native Gauss Elimination method as $$a_i = \frac{1}{c_{i,i}^{(i)}}\left(b_i^{(i)} - \sum_{j=i+1, j \le Z}^{Z} c_{i,j}^{(i)} a_j\right), \text{ where } i = Z, Z-1, Z-2, \ldots, 0.$$

Therefore, the polynomial function of $F_{pre}(t+1)$ is obtained, that is, the prediction of the pre-processing position $x'_{predition}$ is determined. When $x'_{predition}$ (that is, S'(n+1)) is computed by the above, the predicted position of the original sequence S(n+1) (that is, S'(n+1)) can be determined by the reverse transformation described above as follows: S(n+1)=S'(n+1)−S'(n).

In the analysis of traffic flow, the front-edge and rear-edge of the shockwave are predicted. Please refer to FIG. 6 and FIG. 7, wherein FIG. 6 is a diagram showing traffic flow predictions of the vehicle driving shockwave predictive analysis for active safe driving according to the present invention, and FIG. 7 is a diagram showing traffic flow predictions of the vehicle driving shockwave predictive analysis for active safe driving according to the present invention.

In the case of traffic flow, the traffic flow is considered, so the predictive positions of traffic flow of the front-edge and the rear-edge of the shockwave in position-time curves are determined according to the previous n processes, respectively. The general functions of predictions of the traffic flow of the front-edge and the rear-edge of the shockwave are represented as $x_{Front-Edge}^{Ma_{SW}}(t)$ and $x_{Rear-Edge}^{Ma\_SW}(t)$, respectively, which are indicated as $$\begin{cases} x_{Rear-Edge}^{Ma\_SW}(t) = a_0 + a_1 t + a_2 t^2 + \ldots + a_n t^n \\ x_{Front-Edge}^{Ma\_SW}(t) = a_0 + a_1 t + a_2 t^2 + \ldots + a_n t^n \end{cases}.$$

Figure 6:
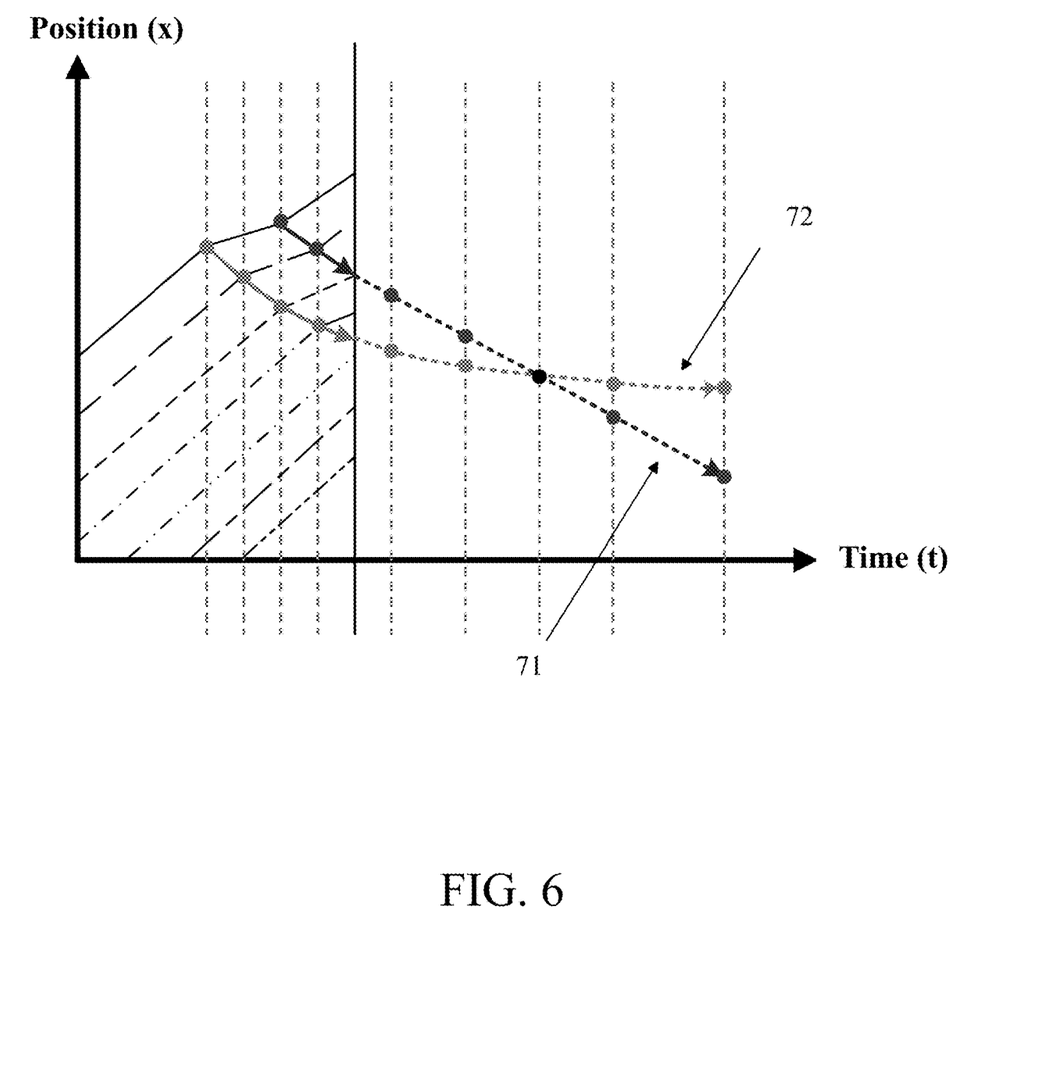
FIG. 6 is a diagram showing traffic flow predictions of the vehicle driving shockwave predictive analysis for active safe driving according to the present invention.

$x_{Front-Edge}^{Ma_{SW}}(t)$ is the curve 71 in FIG. 6, and $x_{Rear-Edge}^{Ma\_SW}(t)$ is the curve 72 in FIG. 6.

Figure 7:
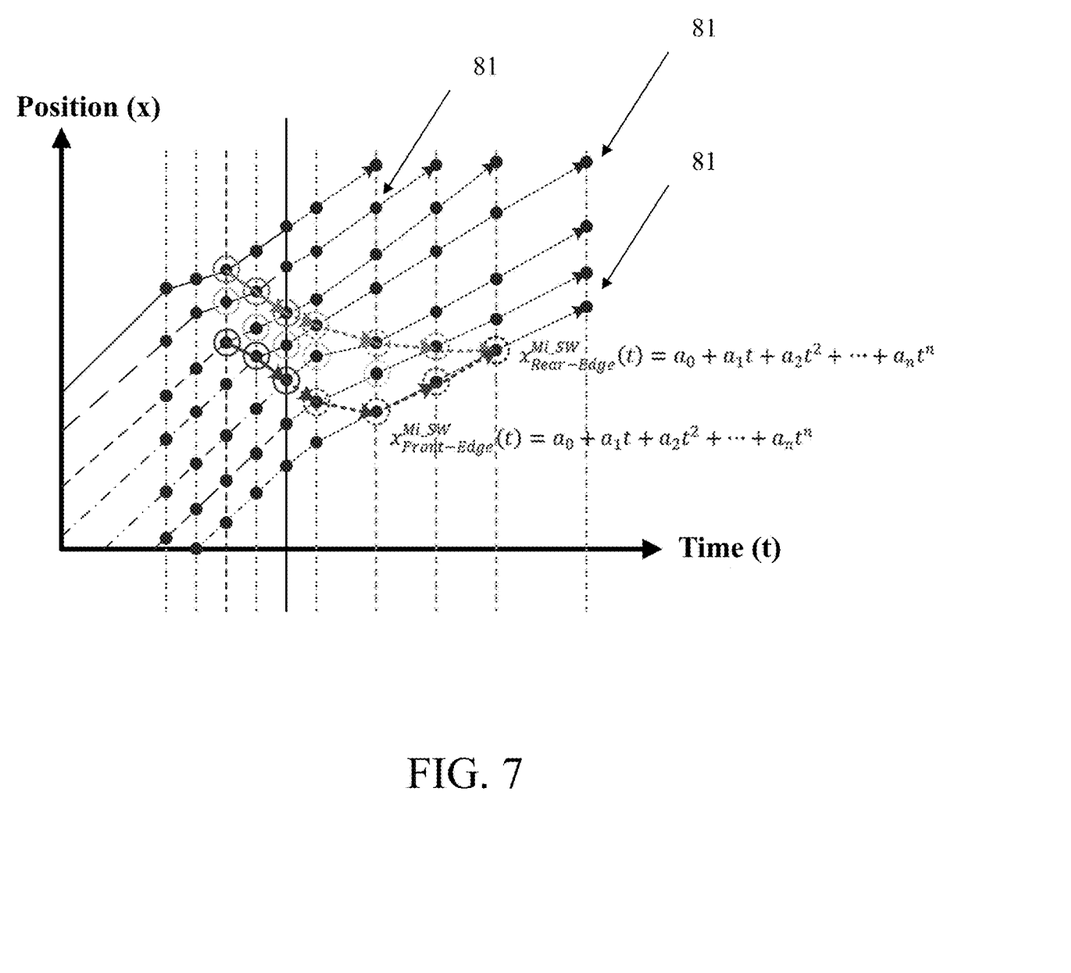
FIG. 7 is a diagram showing traffic flow predictions of the vehicle driving shockwave predictive analysis for active safe driving according to the present invention.

Secondly, in the analysis of each moving vehicle, the front-edge and the rear-edge of the predicted shockwave are referred to FIG. 7. In the case of each moving vehicle, the vehicle view is considered, so the predicted position of each moving vehicle is determined based on the previous process of each moving vehicle, i.e., $x_0(t_0+1)$, $x_1(t_0+1)$, where $x_0(t_0+1)$ denotes the predictive position of vehicle 0 at the observed time $t_0$.

According to the analysis of each moving vehicle, the functions of the front-edge and the rear-edge of the backward shockwave of each moving vehicle in the position-time graph are represented as $x_{Front-Edge}^{Mi\_SW}(t)$ and $x_{Rear-Edge}^{Mi\_SW}(t)$, respectively. It is indicated that the predicted position 81 of each moving vehicle can be determined from the prediction, and the predicted position 81 of each moving vehicle is as shown in FIG. 7. For example, assuming that the predicted positions of the vehicle 2 (at time $t_0$), the vehicle 3 (at time $t_0-1$) and the vehicle 4 (at time $t_0-2$) are analyzed as the inputs of the front-edge function determination, i.e., $x_2(t_0)$, $x_3(t_0-1)$, $x_4(t_0-2)$. The predicted positions of the vehicle 4 (at time $t_0$), the vehicle 5 (at time $t_0-1$) and the vehicle 6 (at time $t_0-2$) are analyzed as the inputs of the rear-edge function determination, i.e., $x_4(t_0)$, $x_5(t_0-1)$, $x_6(t_0-2)$. $x_{Rear-Edge}^{Mi\_SW}(t)$ are as follows:

$$\begin{cases} x_{Rear-Edge}^{Mi\_SW}(t) = a_0 + a_1 t + a_2 t^2 + \ldots + a_n t^n \\ x_{Front-Edge}^{Mi\_SW}(t) = a_0 + a_1 t + a_2 t^2 + \ldots + a_n t^n \end{cases}.$$

The experimental values at this stage show the position-time graph from certain vehicles (at time $t_0-3$, time $t_0-2$, time $t_0-1$, and time $t_0$) as input values for the analysis of each moving vehicle to determine the front-edge and the rear-edge functions of the backward shockwave.

Figure 8:
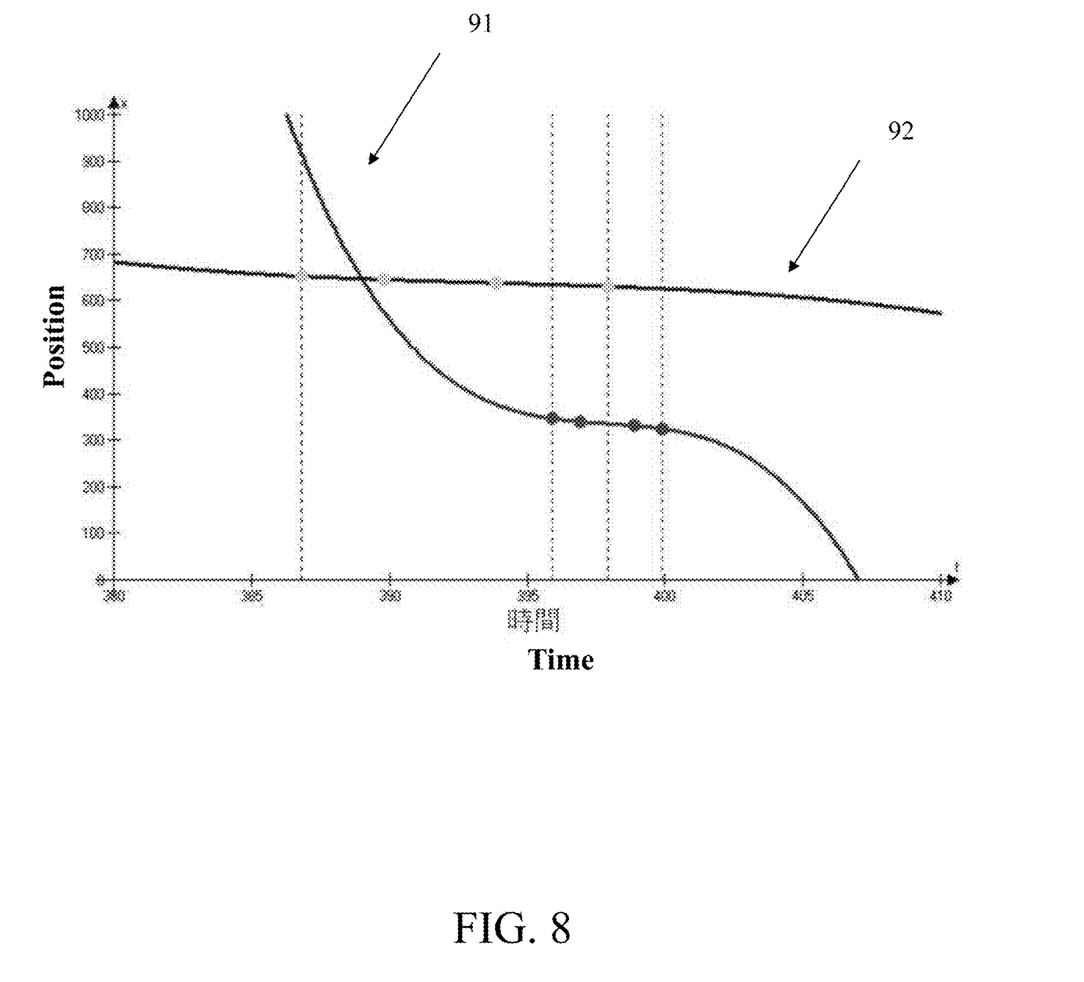
FIG. 8 is a diagram showing curves of a front end and a rear end of shockwaves of each moving vehicle of the vehicle driving shockwave predictive analysis for active safe driving according to the present invention.

Finally, the positions of the front-edge and the rear-edge functions can be predicted for any future time. Please refer to FIG. 8, and FIG. 8 is a diagram showing curves of a front end and a rear end of shockwaves of each moving vehicle of the vehicle driving shockwave predictive analysis for active safe driving according to the present invention. The time 400 of the traffic flow is observed, the curve of the front-edge function of the backward shockwave 91 and the curve of the rear-edge function of the backward shockwave 92 are as shown in FIG. 8, and the first intersection point at the time 389.004 means the beginning point of the backward shockwave. In addition, in the FIG. 8, the second intersection point does not exist at current time, and it means that the backward shockwave cannot be removed in the future, which means that the backward shockwave leads to a serious traffic congestion.

It is noted that the differences between traffic flow and each moving vehicle measurements of the front-edge and the rear-edge of the shockwave are as follows. The predicted result of the traffic flow is the position function of the shockwave, and the predictive result at different times can be determined by substituting the future time to the determined position function of the front-edge and the rear-edge of the shockwave. The predicted result of each moving vehicle is the position of each moving vehicle, and the prediction results of each moving vehicle at different times can be almost determined. Then, based on the depicted analysis of each moving vehicle, these predicted positions of each moving vehicle act as inputs of the previous position of the shockwave (i.e., the front-edge or the rear-edge). The results can be obtained by using the same prediction algorithm to obtain the predicted front-edge or rear-edge function of the backward shockwave. Finally, the predicted results of the different time of the shockwave can be properly determined.

The predicted front-edge and rear-edge functions of the shockwave (in the aspects of traffic flow and each moving vehicle) have been determined, and the ideal time (seconds) intersection of the front-edge and rear-edge functions (or curves) indicates that the shockwave is completely removed, i.e., if $x_{Front-Edge}^{Ma}(t) = x_{Rear-Edge}^{Ma}(t)$.

Since any two adjacent vehicles should remain at least one safety distance ($d_{safe}$) and vehicle length ($L_{Vebi}$) in actual driving, the actual driving shockwave release condition is updated to:

$$R_{effect}^{SW} = X_{Rear-Edge}^{SW}(t) - X_{Front-Edge}^{SW}(t)$$

if $R_{effect}^{SW} \leq d_{safe} + 2L_{Vebi}$.

The prediction method correctly predicts the start and stop times of the shockwave to avoid the threat of unstable or sudden braking dangerous driving. After receiving the predicted analysis information in the emergency message from the three-tier cloud data center, the platooning vehicles receive the predicted backward shockwave information, and execute the synchronous velocity control, i.e., the platoon braking and accelerating at the same time while receiving predictive backward shockwave messages. The functionality of the threat driving avoidance can be achieved certainly. That is, the proposed prediction method realizes the active safe driving mechanism for the human driving and autonomous self-driving.

Figure 9A:
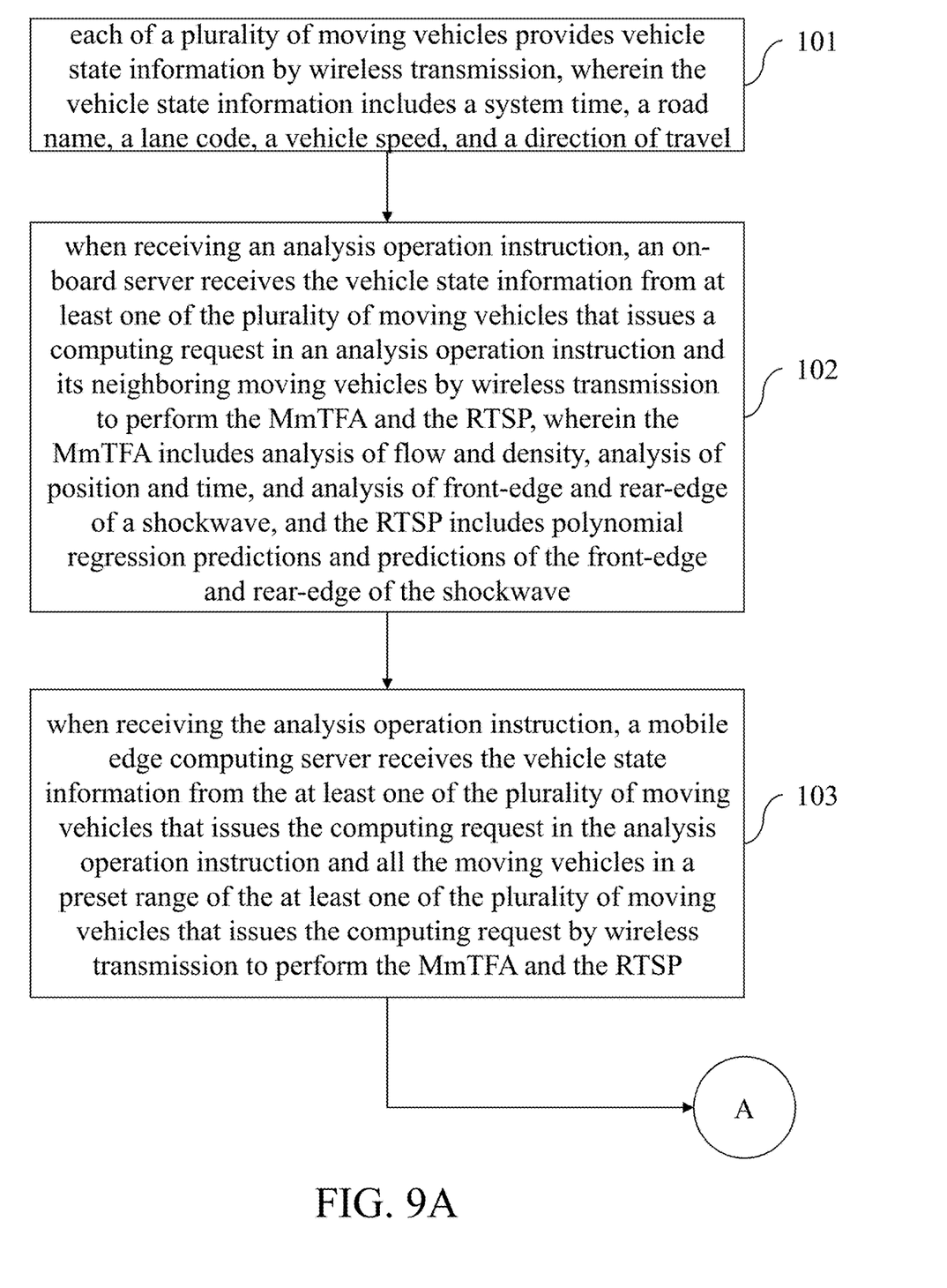
FIG. 9A and FIG. 9B are flow charts of the vehicle driving shockwave predictive analysis for active safe driving according to the present invention.
Figure 9B:
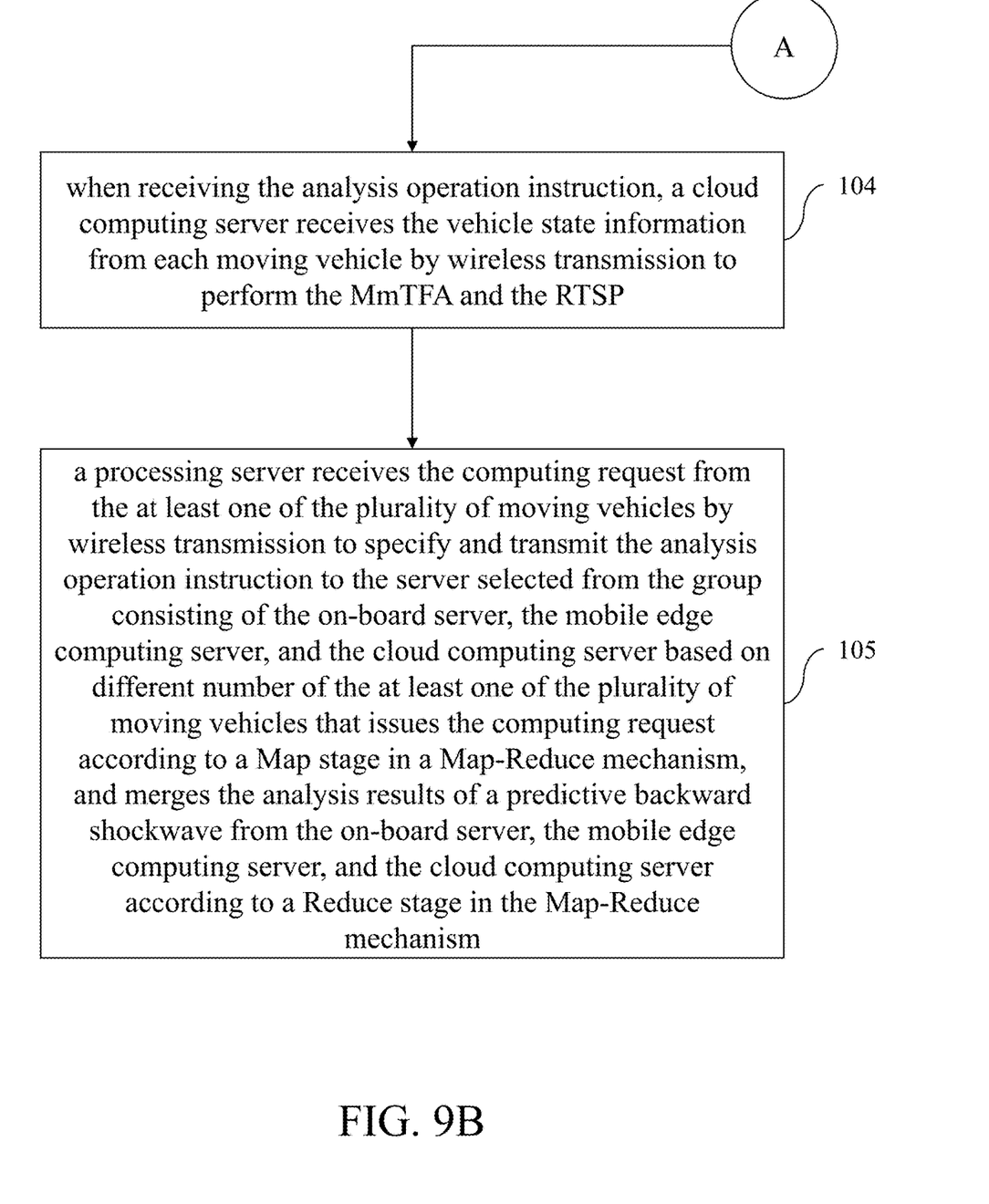

As shown in FIG. 9A and FIG. 9B, wherein FIG. 9A and FIG. 9B are flow charts of the vehicle driving shockwave predictive analysis for active safe driving according to the present invention. The vehicle driving shockwave predictive analysis for active safe driving comprises the following steps.

First, each of a plurality of moving vehicles provides vehicle state information by wireless transmission, wherein the vehicle state information includes a system time, a road name, a lane code, a vehicle speed, and a direction of travel (step 101). Next, when receiving an analysis operation instruction, an on-board server receives the vehicle state information from at least one of the plurality of moving vehicles that issues a computing request in an analysis operation instruction and its neighboring moving vehicles by wireless transmission to perform the MmTFA and the RTSP, wherein the MmTFA includes analysis of flow and density, analysis of position and time, and analysis of front-edge and rear-edge of a shockwave, and the RTSP includes polynomial regression predictions and predictions of the front-edge and rear-edge of the shockwave (step 102). Then, when receiving the analysis operation instruction, a mobile edge computing server receives the vehicle state information from the at least one of the plurality of moving vehicles that issues the computing request in the analysis operation instruction and all the moving vehicles in a preset range of the at least one of the plurality of moving vehicles that issues the computing request by wireless transmission to perform the MmTFA and the RTSP (step 103). Then, when receiving the analysis operation instruction, a cloud computing server receives the vehicle state information from each moving vehicle by wireless transmission to perform the MmTFA and the RTSP (step 104). Finally, a processing server receives the computing request from the at least one of the plurality of moving vehicles by wireless transmission to specify and transmit the analysis operation instruction to the server selected from the group consisting of the on-board server, the mobile edge computing server, and the cloud computing server based on different number of the at least one of the plurality of moving vehicles that issues the computing request according to a Map stage in a Map-Reduce mechanism, and merges the analysis results of a predictive backward shockwave from the on-board server, the mobile edge computing server, and the cloud computing server according to a Reduce stage in the Map-Reduce mechanism (step 105).

In summary, it can be seen that the differences from the prior art are that the predictions are performed based on big data from the collection of the vehicle state information; the high threats of the backward shockwave are analyzed; the threat messages promulgated from vehicles in high-threat areas through a three-tier cloud computing mechanism are analyzed to reduce driving threats and shockwaves in traffic flow; and the PSA microscopic car-following analysis is performed to achieve active safe driving in autonomous self-driving vehicles and the human-driving vehicles. Thus, the predicted relative error rate, the accuracy of the backward shockwave measurement, the AVV, the ATT, the NoVs, the TTC, and the DTC of the present invention are superior to those of the prior art.

By means of this technical means, the problem that minimizing and avoiding dangerous and unstable driving of human or autonomous self-driving without the cloud computing can be solved, thereby achieving the technical effect of using the multi-tier cloud computing to perform the shockwave prediction analysis for active safe driving.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A vehicle driving shockwave prediction system for active safe driving, comprising:
   a plurality of moving vehicles, each configured to provide vehicle state information by wireless transmission, wherein the vehicle state information including a system time, a road name, a lane code, a vehicle speed, and a direction of travel;
   an on-board server, configured to receive the vehicle state information from at least one of the plurality of moving vehicles that issues a computing request in an analysis operation instruction and its neighboring moving vehicles by wireless transmission to perform the Macroscopic and Microscopic Traffic Flow Analyses (MmTFA) and the Real-Time Macroscopic and Microscopic Shockwave Predictions (RTSP) when receiving the analysis operation instruction, wherein the MmTFA including analysis of flow and density, analysis of position and time, and analysis of front-edge and rear-edge of a shockwave, and the RTSP including polynomial regression predictions and predictions of the front-edge and rear-edge of the shockwave;
   a mobile edge computing server, configured to receive the vehicle state information from the at least one of the plurality of moving vehicles that issues the computing request in the analysis operation instruction and all the moving vehicles in a preset range of the at least one of the plurality of moving vehicles that issues the computing request by wireless transmission to perform the MmTFA and the RTSP when receiving the analysis operation instruction;
   a cloud computing server, configured to receive the vehicle state information from each moving vehicle by wireless transmission to perform the MmTFA and the RTSP when receiving the analysis operation instruction; and
   a processing server, configured to receive the computing request from the at least one of the plurality of moving vehicles by wireless transmission to specify and transmit the analysis operation instruction to the server selected from the group consisting of the on-board server, the mobile edge computing server, and the cloud computing server based on different number of the at least one of the plurality of moving vehicles that issues the computing request according to a Map stage in a Map-Reduce mechanism, and merge the analysis results of a predictive backward shockwave from the on-board server, the mobile edge computing server, and the cloud computing server according to a Reduce stage in the Map-Reduce mechanism.

2. The vehicle driving shockwave prediction system according to claim 1, wherein the analysis of flow and density is as follows:
   expressing the analysis of traffic flow q(t) as $q(t)=k(t) \times \bar{v}(t)$ according to traffic flow theory, where k(t) is a factor of traffic density at time t, $\bar{v}(t)$ is an average speed at time t;
   expressing the factor k(t) of the traffic density at time t as $$k(t) = \frac{N(t)}{L(t)},$$

where N(t) is the number of the moving vehicles on a road segment or within a platoon at time t, and L(t) is a length of the road segment or the platoon at time t;

expressing a speed v(t) at time t as $$v(t) = v_f(t) - \left(\frac{v_f(t)}{k_J(t)}\right)k(t)$$

according to the Green shielded model, where $v_f(t)$ denotes the free flow speed, $k_j(t)$ denotes the density of a jam flow, and setting $k_j(t)$ to half of the maximum $k_{max}(t)$ to obtain $$q(t) = k(t)v(t) = k(t)\left[v_{FFS}(t) - \left(\frac{v_{FFS}}{k_{Jam}}\right)k(t)\right] = v_f(t)k_t(t) - \left(\frac{v_{FFS}(t)}{k_{Jam}(t)}\right)k^2(t);$$

the maximum traffic flow $q_{max}(t)$ occurring at $$\frac{dq(t)}{dk(t)} = 0,$$

so that obtaining $$\frac{dq(t)}{dk(t)} = 0 = v_f(t) - \left(\frac{v_{FFS}(t)}{k_{Jam}(t)}\right)2k(t) \text{ or } k(t) = \frac{k_{Jam}(t)}{2},$$

and then obtaining $$q_{max}(t) = \frac{v_{FFS}(t)k_{Jam}(t)}{4},$$

and a speed of the maximum traffic flow $$v_{qMax}(t) = v_{FFS}(t) - \left(\frac{v_{FFS}(t)}{k_{Jam}(t)}\right)\frac{k_{Jam}(t)}{2} = \frac{v_{FFS}(t)}{2};$$

and determining a speed of a backward shockwave at time t as $$W^{SW}_{P_i,P_{i+1}}(t) = \frac{q^{Ma}_{P_1}(t) - q^{Ma}_{P_{i+1}}(t)}{k^{Ma}_{P_1}(t) - k^{Ma}_{P_{i+1}}(t)}.$$

3. The vehicle driving shockwave prediction system according to claim 1, wherein the analysis of position and time is that after analyzing a backward shockwave speed by using flow-density curve of traffic flow, a position-time curve mechanism is extended to analyze shockwaves gathered from data information of the moving vehicles adjacent to each moving vehicle; and the analysis of the front-edge and rear-edge of the shockwave is configured to define the front-edge and the rear-edge of the shockwave respectively, wherein the front-edge of the shockwave initiates the shockwave, the rear-edge of the shockwave releases the shockwave, and the front-edge of the backward shockwave means that a threat is initiated to notify all the successor moving vehicles.

4. The vehicle driving shockwave prediction system according to claim 1, wherein the polynomial regression predictions are as follows:
executing a preprocess step to generate a new data sequence by summation of previous n data as $S'(n)=\Sigma_{p=1}^{n}S(p)$, where S(p) means the original data sequence, S'(n) means the new data sequence after executing the preprocess step;

expressing a predictive position in the new data sequence as $x_{predition}'=F_{pre}(t+1)$ after executing the preprocess step, where $F_{pre}(t)$ is a polynomial function with Z+1 unknown coefficients as $F_{pre}(t)=a_0t^0+a_1t^1+a_2t^2+ \ldots +a_Zt^Z$;

expressing a predictive position of the previous hth process as $F_{pre}(t_h)=a_0t_h^0+a_1t_h^1+a_2t_h^2+ \ldots +a_Zt_h^Z$;

letting $R_h$ be a position of the previous hth process, and then defining the sum of the square of difference between actual R and predictive $F_{pre}(t)$ of previous n processes as $D=\Sigma_{h=1}^{H}[R_h-(a_0t_h^0+a_1t_h^1+a_2t_h^2+ \ldots +a_Zt_h^Z)]^2$;

taking partial differential of each $a_i$, setting each partial differential equation to zero, and then obtaining the following equivalent polynomials:

$$\begin{cases} a_0\left(\sum_{h=1}^{H}t_h^0\right) + a_1\left(\sum_{h=1}^{H}t_h^1\right) + \ldots + a_Z\left(\sum_{h=1}^{H}t_h^Z\right) = \sum_{h=1}^{H}t_h^0 R_h \\ a_0\left(\sum_{h=1}^{H}t_h^1\right) + a_1\left(\sum_{h=1}^{H}t_h^2\right) + \ldots + a_Z\left(\sum_{h=1}^{H}t_h^{Z+1}\right) = \sum_{h=1}^{H}t_h^1 R_h \\ \vdots \\ a_0\left(\sum_{h=1}^{H}t_h^Z\right) + a_1\left(\sum_{h=1}^{H}t_h^{Z+1}\right) + \ldots + a_Z\left(\sum_{h=1}^{H}t_h^{2Z}\right) = \sum_{h=1}^{H}t_h^Z R_h \end{cases} ; \text{ and}$$

determining each coefficient $a_i$ by the Native Gauss Elimination method as $$a_i = \frac{1}{C_{i,i}^{(i)}}\left(b_i^{(i)} - \sum_{j=i+1, j\leq Z}^{Z} C_{i,j}^{(i)} a_j\right), \text{ where } i = Z, Z-1, Z-2, \ldots, 0.$$

5. The vehicle driving shockwave prediction system according to claim 1, wherein the predictions of the front-edge and rear-edge of the shockwave are as follows:
determining the predictive positions of traffic flow of the front-edge and the rear-edge of the shockwave in position-time curves according to the previous n processes, respectively, where the predictive positions of the traffic flow of the front-edge and the rear-edge of the shockwave determined as $x_{Front-Edge}^{Ma\_SW}(t)$ and $x_{Rear-Edge}^{Ma\_SW}(t)$, respectively, indicated as follows:

$$\begin{cases} x_{Rear-Edge}^{Ma\_SW}(t) = a_0 + a_1 t + a_2 t^2 + \ldots + a_n t^n \\ x_{Front-Edge}^{Ma\_SW}(t) = a_0 + a_1 t + a_2 t^2 + \ldots + a_n t^n \end{cases};$$

the predictive result of the traffic flow being a position function of the shockwave, and determining the predictive result at different times by substituting future time to the determined position functions of the front-edge and the rear-edge of the shockwave; and the predictive result of each moving vehicles being the position of each moving vehicle to determine the predictive results for each moving vehicle at different times, these predicted positions of each moving vehicle acting as inputs of the previous positions of the shockwave, using the predictions of the front-edge and rear-edge of the shockwave to obtain the predictive front-edge or rear-edge function for the backward shockwave, and properly determining the predictive results of different times of the shockwave.

6. A vehicle driving shockwave prediction method for active safe driving, comprising:

each of a plurality of moving vehicles providing vehicle state information by wireless transmission, wherein the vehicle state information including a system time, a road name, a lane code, a vehicle speed, and a direction of travel;

when receiving an analysis operation instruction, an on-board server receiving the vehicle state information from at least one of the plurality of moving vehicles that issues a computing request in the analysis operation instruction and its neighboring moving vehicles by wireless transmission to perform the Macroscopic and Microscopic Traffic Flow Analyses (MmTFA) and the Real-Time Macroscopic and Microscopic Shockwave Predictions (RTSP) when receiving the analysis operation instruction, wherein the MmTFA including analysis of flow and density, analysis of position and time, and analysis of front-edge and rear-edge of a shockwave, and the RTSP including polynomial regression predictions and predictions of the front-edge and rear-edge of the shockwave;

when receiving the analysis operation instruction, a mobile edge computing server receiving the vehicle state information from the at least one of the plurality of moving vehicles that issues the computing request in the analysis operation instruction and all the moving vehicles in a preset range of the at least one of the plurality of moving vehicles that issues the computing request by wireless transmission to perform the MmTFA and the RTSP when receiving the analysis operation instruction;

when receiving the analysis operation instruction, a cloud computing server receiving the vehicle state information from each moving vehicle by wireless transmission to perform the MmTFA and the RTSP; and a processing server receiving the computing request from the at least one of the plurality of moving vehicles by wireless transmission to specify and transmit the analysis operation instruction to the server selected from the group consisting of the on-board server, the mobile edge computing server, and the cloud computing server based on different number of the at least one of the plurality of moving vehicles that issues the computing request according to a Map stage in a Map-Reduce mechanism, and merging the analysis results of a predictive backward shockwave from the on-board server, the mobile edge computing server, and the cloud computing server according to a Reduce stage in the Map-Reduce mechanism.

7. The vehicle driving shockwave prediction method according to claim 6, wherein the analysis of flow and density further comprises the following steps:

expressing the analysis of traffic flow q(t) as q(t)=k(t)×v̄(t) according to traffic flow theory, where k(t) is a factor of traffic density at time t, v̄(t) an average speed at time t;

expressing the factor k(t) of the traffic density at time t as $$k(t) = \frac{N(t)}{L(t)},$$

where N(t) is the number of the moving vehicles on a road segment or within a platoon at time t, and L(t) is a length of the road segment or the platoon at time t;

expressing a speed v(t) at time t as $$v(t) = v_f(t) - \left(\frac{v_f(t)}{k_J(t)}\right)k(t)$$

according to the Green shielded model, where $v_f(t)$ denotes the free flow speed, $k_J(t)$ denotes the density of a jam flow, and setting $k_J(t)$ to half of the maximum $k_{max}(t)$ to obtain $$q(t) = k(t)v(t) = k(t)\left[v_{FFS}(t) - \left(\frac{v_{FFS}}{k_{Jam}}\right)k(t)\right] = v_f(t)k_t(t) - \left(\frac{v_{FFS}(t)}{k_{Jam}(t)}\right)k^2(t);$$

the maximum traffic flow $q_{max}(t)$ occurring at so that $$\frac{dq(t)}{dk(t)} = 0,$$

so that obtaining $$\frac{dq(t)}{dk(t)} = 0 = v_f(t) - \left(\frac{v_{FFS}(t)}{k_{Jam}(t)}\right)2k(t) \text{ or } k(t) = \frac{k_{Jam}(t)}{2},$$

and then obtaining $$q_{max}(t) = \frac{v_{FFS}(t)k_{Jam}(t)}{4},$$

and a speed of the maximum traffic flow $$v_{qMax}(t) = v_{FFS}(t) - \left(\frac{v_{FFS}(t)}{k_{Jam}(t)}\right)\frac{k_{Jam}(t)}{2} = \frac{v_{FFS}(t)}{2};$$

and determining a speed of a backward shockwave at time t as $$W^{SW}_{P_i,P_{i+1}}(t) = \frac{q^{Ma}_{P1}(t) - q^{Ma}_{P_{i+1}}(t)}{k^{Ma}_{P1}(t) - k^{Ma}_{P_{i+1}}(t)}.$$

8. The vehicle driving shockwave prediction method according to claim 6, wherein the analysis of position and time comprises the step of: after analyzing a backward shockwave speed by using flow-density curve of traffic flow, position-time curve mechanism being extended to analyze shockwaves gathered from data information of the moving vehicles adjacent to each moving vehicle; and the analysis of the front-edge and rear-edge of the shockwave comprises the step of: defining the front-edge and the rear-edge of the shockwave respectively, wherein the front-edge of the shockwave initiates the shockwave, the rear-edge of the shockwave releases the shockwave, and the front-edge of the backward shockwave means that a threat is initiated to notify all the successor moving vehicles.

9. The vehicle driving shockwave prediction method according to claim 6, wherein the polynomial regression predictions further comprises the following steps:

executing a preprocess step to generate a new data sequence by summation of previous n data as $S'(n) = \Sigma_{p=1}^{n} S(p)$, where $S(p)$ means the original data sequence, $S'(n)$ means the new data sequence after executing the preprocess step;

expressing a predictive position in the new data sequence as $x_{predition}' = F_{pre}(t+1)$ after executing the preprocess step, where $F_{pre}(t)$ is a polynomial function with $Z+1$ unknown coefficients as $F_{pre}(t) = a_0 t^0 + a_1 t^1 + a_2 t^2 + \ldots + a_Z t^Z$;

expressing a predictive position of the previous hth process as $F_{pre}(t_h) = a_0 t_h^0 + a_1 t_h^1 + a_2 t_h^2 + \ldots + a_Z t_h^Z$;

letting $R_h$ be a position of the previous hth process, and then defining the sum of the square of difference between actual R and predictive $F_p(t)$ of previous n processes as $D = \Sigma_{h=1}^{H} [R_h - (a_0 t_h^0 + a_1 t_h^1 + a_2 t_h^2 + \ldots + a_Z t_h^Z)]^2$;

taking partial differential of each $a_i$, setting each partial differential equation to zero, and then obtaining the following equivalent polynomials:

$$\begin{cases} a_0 \left(\sum_{h=1}^{H} t_h^0\right) + a_1 \left(\sum_{h=1}^{H} t_h^1\right) + \ldots + a_Z \left(\sum_{h=1}^{H} t_h^Z\right) = \sum_{h=1}^{H} t_h^0 R_h \\ a_0 \left(\sum_{h=1}^{H} t_h^1\right) + a_1 \left(\sum_{h=1}^{H} t_h^2\right) + \ldots + a_Z \left(\sum_{h=1}^{H} t_h^{Z+1}\right) = \sum_{h=1}^{H} t_h^1 R_h \\ \vdots \\ a_0 \left(\sum_{h=1}^{H} t_h^Z\right) + a_1 \left(\sum_{h=1}^{H} t_h^{Z+1}\right) + \ldots + a_Z \left(\sum_{h=1}^{H} t_h^{2Z}\right) = \sum_{h=1}^{H} t_h^Z R_h \end{cases} ; \text{ and}$$

determining each coefficient $a_i$ by the Native Gauss Elimination method as $$a_i = \frac{1}{C_{i,i}^{(i)}} \left( b_i^{(i)} - \sum_{j=i+1, j \leq Z}^{Z} C_{i,j}^{(i)} a_j \right), \text{ where } i = Z, Z-1, Z-2, \ldots, 0.$$

10. The vehicle driving shockwave prediction method according to claim 6, wherein the predictions of the front-edge and rear-edge of the shockwave further comprises the following steps:

determining the predictive positions of traffic flow of the front-edge and the rear-edge of the shockwave in position-time curves according to the previous n processes, respectively, where the predictive positions of the traffic flow of the front-edge and the rear-edge of the shockwave determined as $x_{Front-Edge}^{Ma\_SW}(t)$ and $x_{Rear-Edge}^{Ma\_SW}(t)$, respectively, indicated as follows:

$$\begin{cases} x_{Rear-Edge}^{Ma\_SW}(t) = a_0 + a_1 t + a_2 t^2 + \ldots + a_n t^n \\ x_{Front-Edge}^{Ma\_SW}(t) = a_0 + a_1 t + a_2 t^2 + \ldots + a_n t^n \end{cases} ;$$

the predictive result of the traffic flow being a position function of the shockwave, and determining the predictive result at different times by substituting future time to the determined position function of the front-edge and the rear-edge of the shockwave; and the predictive result of each moving vehicles being the position of each moving vehicle to determine the predictive results for each moving vehicle at different times, these predicted positions of each moving vehicle acting as inputs of the previous positions of the shockwave, using the predictions of the front-edge and rear-edge of the shockwave to obtain the predictive front-edge or rear-edge function for the backward shockwave, and properly determining the predictive results of different times of the shockwave.

* * * * *